(12) United States Patent
Liu

(10) Patent No.: US 6,888,825 B1
(45) Date of Patent: May 3, 2005

(54) CROSS-CONNECT WITH SHARED STORAGE

(75) Inventor: Peter Yongchun Liu, San Jose, CA (US)

(73) Assignee: Redback Networks Inc., San Jose, CA (US)

( * ) Notice: Subject to any disclaimer, the term of this patent is extended or adjusted under 35 U.S.C. 154(b) by 861 days.

(21) Appl. No.: 09/752,649

(22) Filed: Dec. 29, 2000

(51) Int. Cl.[7] .............................................. H04L 12/50
(52) U.S. Cl. ...................... 370/359; 370/376; 370/388
(58) Field of Search ................................. 370/357, 359, 370/375, 376, 378, 388, 415, 387

(56) References Cited

U.S. PATENT DOCUMENTS

| | | | | |
|---|---|---|---|---|
| 4,198,546 A | * | 4/1980 | Schlichte ..................... | 370/380 |
| 5,014,268 A | * | 5/1991 | Tyrrell et al. ............... | 370/374 |
| 5,331,632 A | * | 7/1994 | Aaron et al. ................. | 370/376 |
| 5,381,406 A | * | 1/1995 | Yamashita ................... | 370/376 |
| 6,101,198 A | | 8/2000 | Koenig et al. | |
| 6,195,335 B1 | * | 2/2001 | Calvignac et al. .......... | 370/236 |
| 6,498,792 B1 | * | 12/2002 | Johnson et al. ............. | 370/388 |
| 6,628,650 B1 | * | 9/2003 | Saito et al. .................. | 370/369 |
| 6,728,238 B1 | * | 4/2004 | Long et al. .................. | 370/352 |
| 2002/0085578 A1 | * | 7/2002 | Dell et al. ................... | 370/422 |

* cited by examiner

Primary Examiner—Chau Nguyen
Assistant Examiner—Brad Mace
(74) Attorney, Agent, or Firm—Blakely, Sokoloff, Taylor & Zafman LLP

(57) ABSTRACT

A method and apparatus for sharing storage in a cross-connect. According to one embodiment of the invention, a cross-connect includes a number of sets of data input lines and a number of matrices. Each of the sets of data input lines is to be coupled to a different line card. Each of the matrices is coupled to every one of the sets of data input lines. In addition, each of the matrices has a set of data output lines, where the set of data input lines of each of the matrices is to be coupled to a different one of the line cards.

17 Claims, 3 Drawing Sheets

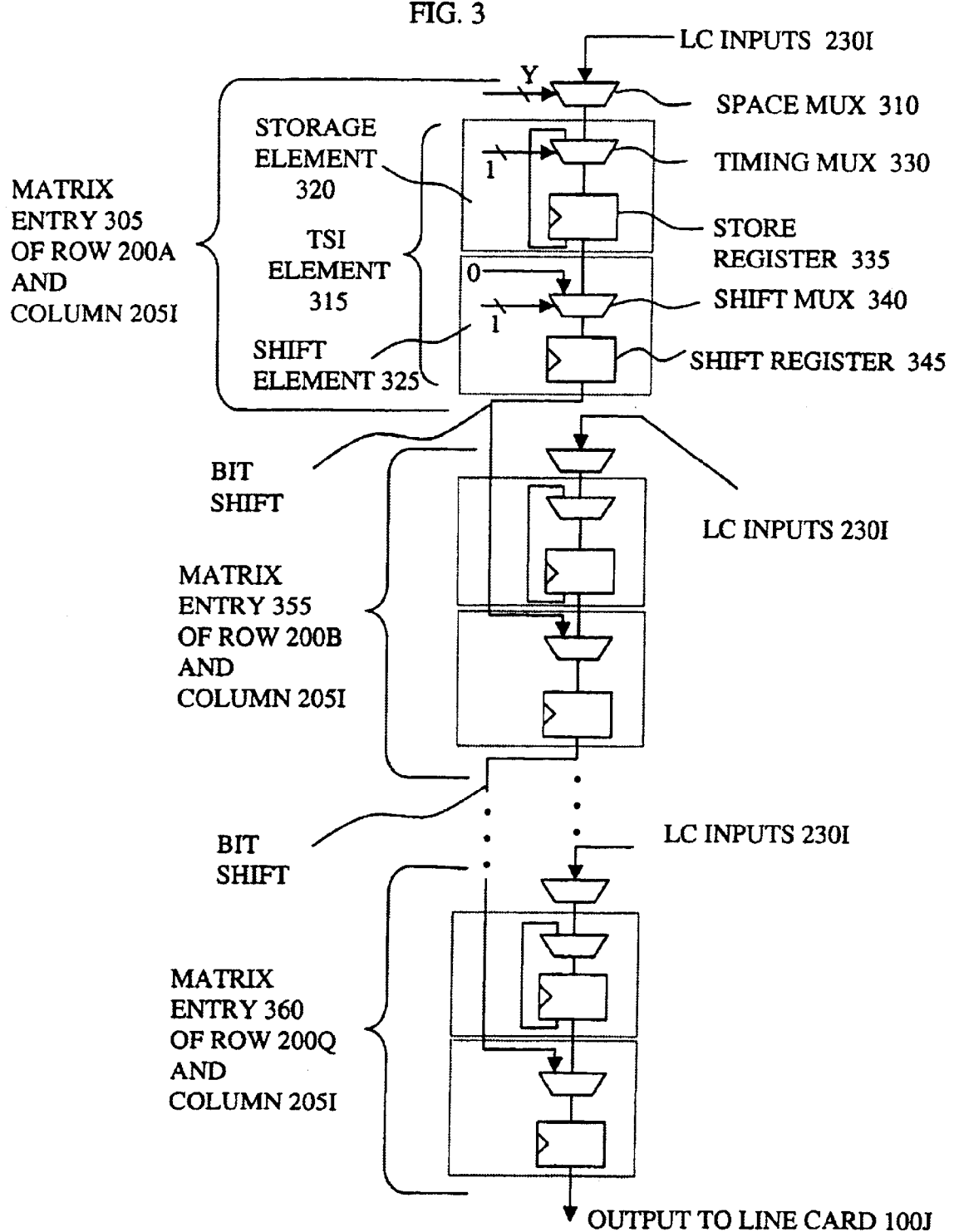

US 6,888,825 B1

CROSS-CONNECT WITH SHARED STORAGE

CROSS-REFERENCE TO RELATED APPLICATIONS

Not Applicable.

BACKGROUND OF THE INVENTION

1. Field of the Invention

The invention relates to the field of digital circuitry. More specifically, the invention relates to a cross-connect.

2. Background of the Invention

The current explosion of data traffic traversing the public network is forcing the carriers to change their approach when designing their networks. Time Division Multiplexing (TDM) networks have a place in the telecommunications network, as certain customers require the reservation of portions of bandwidth within the network. The telecommunication industry has sought to maximize the data throughput by developing techniques allowing for the simultaneous transmission of multiple channels on a single telecommunications medium. Data multiplexing is not new to the industry, but introducing new methods in their design are certainly welcomed.

A typical TDM network element includes a number of line cards. Data enters and exits the network element through these line cards. The line cards are coupled to a cross-connect that allows for traffic to be selectively transmitted from any of the line cards to any of the other line cards. Thus, the TDM traffic is aligned and switched through the cross-connect.

A typical cross-connect includes three modules: 1) an input Time Slot Interchange (TSI); 2) a switch; 3) and an output TSI. The traffic of each of the line cards is provided to the input TSI. The input TSI includes a buffer for each line card that can reorder the incoming data into a different sequence and/or selectively store parts of it. The output TSI also includes a buffer for each line card. The switch is controlled to selectively provide the output of any one of the buffers in the input TSI to be provided to any one of the buffers of the output TSI. Similar to the buffers of the input TSI, the buffers of the output TSI can selectively reorder and/or selectively store the data. Thus, the buffer of the output TSI can intermix the data from different line cards when the switch and output TSI are so controlled.

A limitation of this prior art method is that it necessitates relatively larger amounts of memory of a type that is typically operated at lower frequencies.

BRIEF SUMMARY OF THE INVENTION

A method and apparatus for sharing storage in a cross-connect is described. According to one embodiment of the invention, a cross-connect includes a number of sets of data input lines and a number of matrices. Each of the sets of data input lines is to be coupled to a different line card. Each of the matrices is coupled to every one of the sets of data input lines. In addition, each of the matrices has a set of data output lines, where the set of data input lines of each of the matrices is to be coupled to a different one of the line cards.

BRIEF DESCRIPTION OF THE DRAWINGS

The invention may best be understood by referring to the following description and accompanying drawings that are used to illustrate embodiments of the invention. In the drawings:

FIG. 3 is a diagram representing a single column 205I of matrix entries within the matrix 105J of FIG. 2 according to one embodiment of the invention.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

A method and apparatus for sharing storage in a cross-connect is described. While the described cross-connect can be used for many applications, one exemplary use of the cross-connect is in performing Digital Cross-connections and Switching techniques in telecommunication networks. The environment in which the invention is used can encompass many different telecommunication networks where multiplexing methods are applied. In one embodiment, as described in this application, this cross-connect system can be implemented for use in an environment involving Time Division Multiplexing. The implementation of this system has shown a valuable decrease in memory storage necessary to perform digital cross-connections when comparing to prior methods. In addition, the type of memory that can be used to implement the invention (e.g., registers) can be operated at higher frequencies than the type of memory used in prior art cross-connects; thereby allowing for greater density on a chip implementing the cross-connect.

Figure 1:
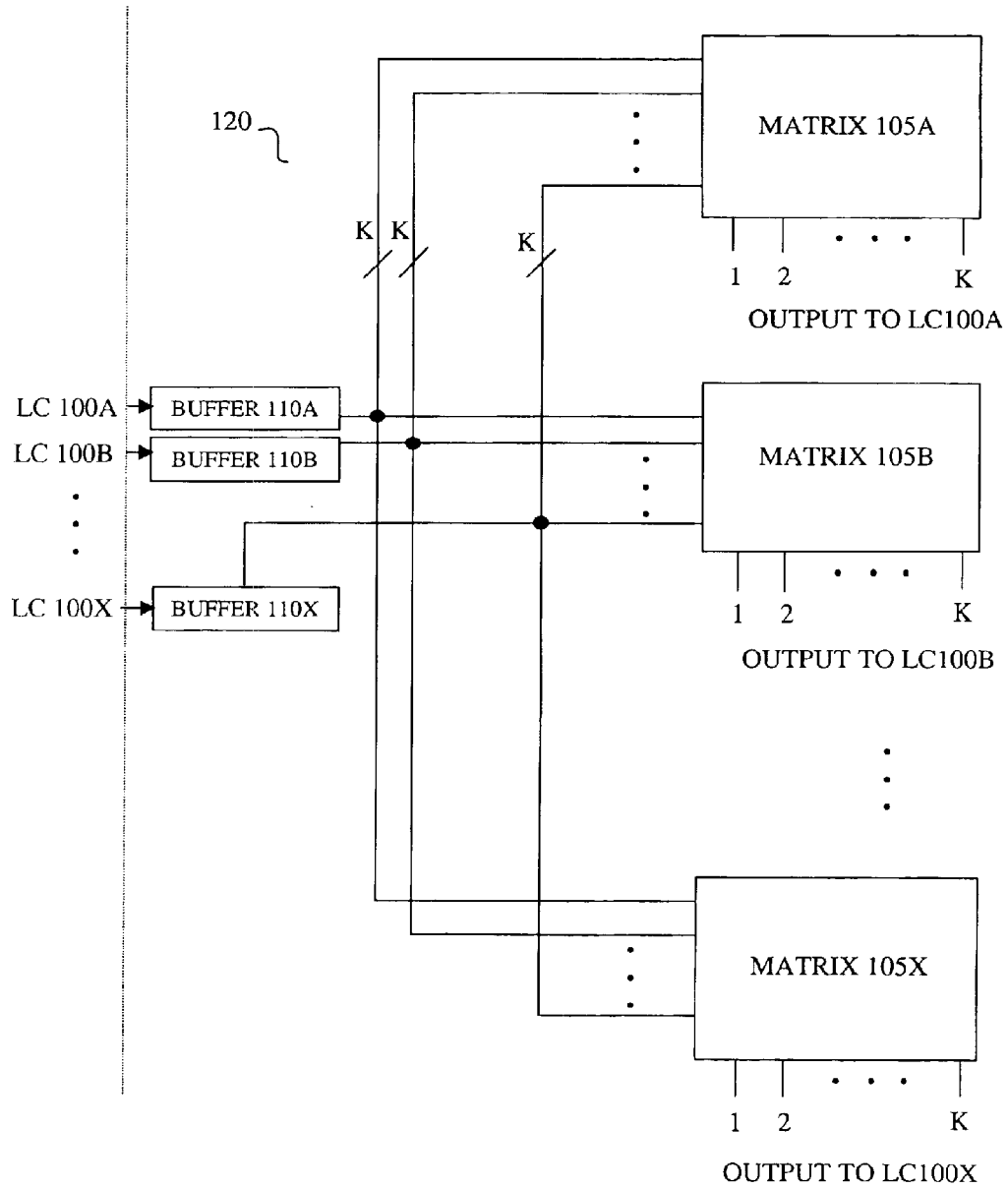
FIG. 1 is a diagram of a cross-connect according to one embodiment of the invention.

FIG. 1 is a diagram of a cross-connect according to one embodiment of the invention. In this Figure, the cross-connect 120 is shown receiving traffic from each of a set of line cards 100A through 100X in a network element. It should be understood that the line cards (LCs) are shown in succession where 100A corresponds to a first line card and 100X corresponds to a last line card in the network element; where X is the number of line cards in that network element coupled to the cross-connect. FIG. 1 also shows a set of buffers 110A through 110X corresponding to the set of line cards 100A through 100X. Thus, traffic from line card 100A enters buffer 110A, as soon. Buffers 110 align the incoming traffic. In one embodiment, each of the buffers 110 operates as a FIFO.

Each of the buffers 110A through 110X outputs K bits at a time over a set of data input lines. The value of K will be described in more detail later herein. FIG. 1 also shows a set of matrices 105A through 105X corresponding to the set of line cards 110A through 100X. It should be understood that there is a matrix for each of the line cards 110A through 100X. Each of the matrices 105A through 105X provides the output for the corresponding line card 100A through 100 and all function alike. Thus, the output of matrix 105A is provided to the line card 100A, and so on. Each of the matrices is coupled to receive the K input data lines from every one of the buffers 110A through 110X.

Figure 2:
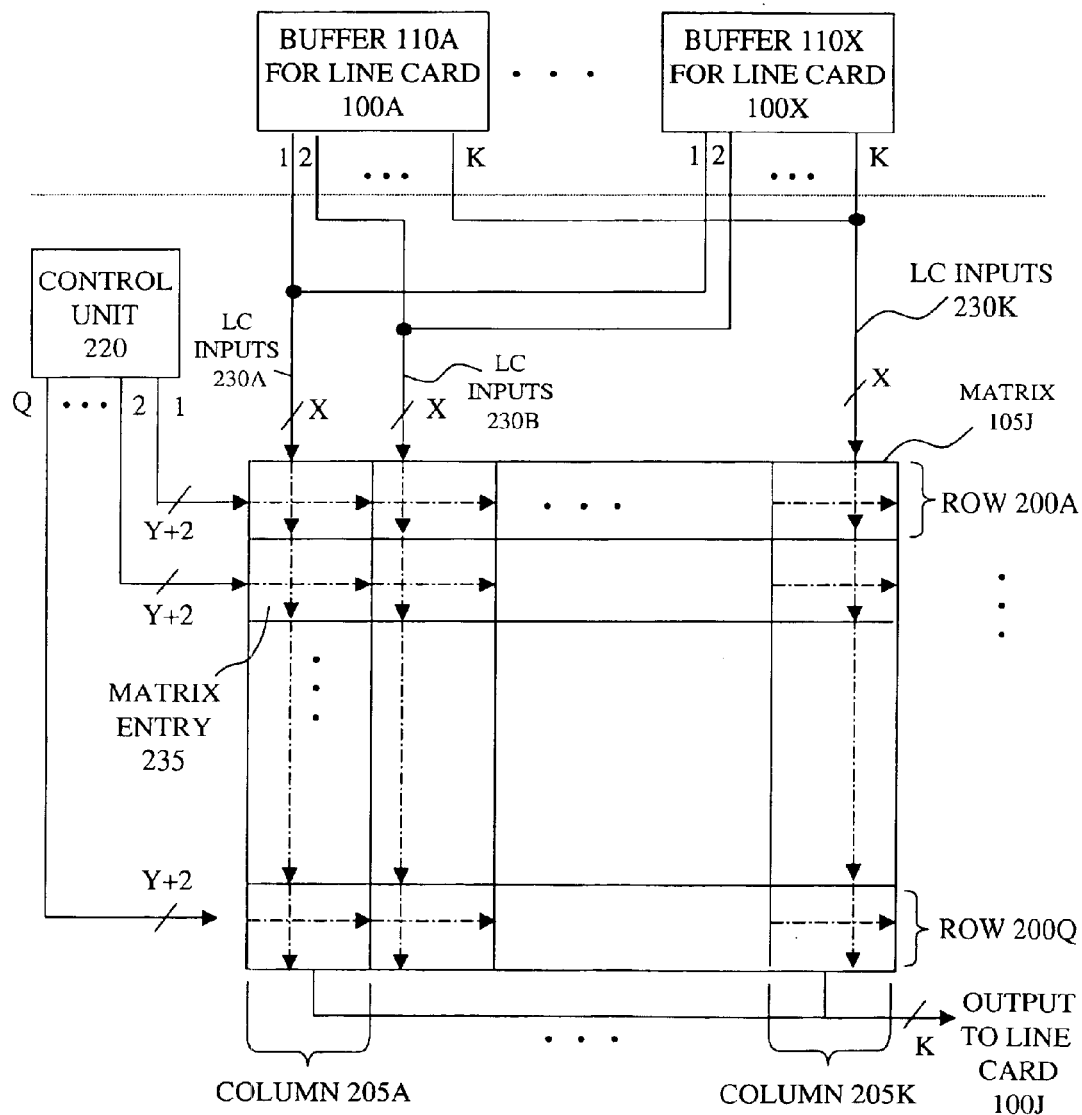
FIG. 2 is a more detailed diagram of one of the matrices 105 from FIG. 1 according to one embodiment of the invention.

FIG. 2 is a more detailed diagram of one of the matrices 105 from FIG. 1 according to one embodiment of the invention, wherein J denotes one of the matrices 105A through 105X. Thus, the matrix 105J is the matrix to provide the output for the line card 100J. Matrix 105J is made up of rows 200A through 200Q and columns 205A through 205K; where Q represents the number of rows and K is the number of columns in the matrix. The values of Q and K change according to the cross-connect design, and are driven at least in part by the bandwidth requirements. The low value of K would be the minimum size of aligned data (e.g., for a digital cross-connect in a SONET/TDM network element, this value would be 8 because this traffic is byte aligned), and can be increased by multiples of two thereafter to a maximum (e.g., for SONET/TDM of OC-N, Q*K=N*8 wherein N is greater than 3 and can be increased by multiples of four).

FIG. 2 shows a control unit 220 that provides Q sets of control lines. Specifically, FIG. 2 shows that each row of the matrix 105J receives a different one the Q sets of control lines. Each set of control lines includes Y+2 lines. The value for Y will described in more detail later herein.

FIG. 2 also shows each of the buffers 110A to 110X providing their set of K data lines to the matrix 105J. In particular, FIG. 2 shows that the data lines in each set of K data lines have an order according to bit position (positions 1 to K) based on the order of the data being provided by the line cards. In addition, the same bit position input data lines from each of the buffers 110A to 110X are independently grouped to form LC inputs 230A through LC inputs 230K. Thus, the LC inputs 230A includes the data lines for bit position 1 from each of the buffers 110A to 110X, and so on. Therefore, each of the LC inputs 230A through 230K includes X data lines, where X represents the number of line cards 100A through 100X.

For every intersection of rows and columns in the matrix 105J, there exists a matrix entry 235. The LC inputs 230A through 230K are respectively provided to the columns 205A through 205K of the matrix 105J. More particularly, the LC inputs provided to a given column are provided to every matrix entry in that column. In addition, the set of control lines from the control unit 220 provided to a given row are provided to every matrix entry in that row.

FIG. 3 is a diagram representing a single column 205I of matrix entries within the matrix 105J of FIG. 2 according to one embodiment of the invention, where 1 denotes one of the columns 205A through 205K. This Figure provides for more detail in describing the matrix entries within a single column of a given matrix 105J. The coupling of each matrix entry in column 205I to the same LC inputs is illustrated by the coupling of LC inputs 230I to: 1) a matrix entry 305 of row 200A and column 205I; 2) a matrix entry 355 of row 200B and column 205I; and 3) a matrix entry 360 of row 200Q and column 205I.

As shown in FIG. 3, the matrix entry 305 of row 200A column 205I is conceptually broken down into two major components: a space mux 310 and a TSI element 315. The LC inputs 230I are coupled to the space mux 310 as data inputs. The space mux 310 is also coupled to a set of control lines originating from the control unit 220, as illustrated in FIG. 2. While the same LC inputs are coupled as data inputs to the space mux of each matrix entry in the column 205I, a different set of the control lines from the control unit 220 is coupled to each of the space muxes in the column 205I.

As shown in FIG. 2, there are Y+2 control lines entering each row of the matrix 105J. Y of these Y+2 control lines are provided to each of the space muxes, where Y is the number of lines required to select one of the LC inputs provided to a matrix entry (thus, $2^Y$=K). Since the same Y control lines are provided to every space mux in a row, a given row is operated to select the data from one of the line cards 100A to 100X at a time. The other 2 control of the Y+2 lines are coupled to other elements in the matrix entry as described later herein.

Returning to FIG. 3, the TSI element 315 is coupled to the output of the space mux 310 and includes two components: a storage element 320 and a shift element 325. The storage element 320 temporarily stores bit data by employing a timing mux 330 and a store register 335. The control input of the timing mux 330 is coupled to one of the control lines in the set of control lines from control unit 220 for row A. The data input of the timing mux 330 is the output of the space mux 310 and a feedback from the store register 335. The input to the store register 335 is the output of the timing mux 330.

The shift element 325 is coupled to the output of the storage element 320 and includes a shift mux 340 and a shift register 345. The data inputs of the shift mux 340 are coupled to the output of the store register 345 and zero. The control input of the shift mux 340 is coupled to the last of the Y+2 control lines in the set of control lines from control unit 220 for row A.

The other matrix entries in column 205I are basically the same as the matrix entry 305, and thus only the difference are described. In particular, as previously described a different set of control lines is provided to each row of the matrix, and thus, the set of control lines provided to each of the matrix entries in column 205I is different. In addition, rather than one of the data inputs of the shift mux of the remaining matrix entries in column 205I being zero, that data input is coupled to the output of the preceding matrix entry (e.g., a data input of the shift mux of matrix entry 355 is coupled to the output of the shift register 345).

It should be understood that each matrix entry is reproduced and coupled to its preceding matrix entry; as shown in FIG. 3, starting at the first row of the matrix column until reaching the last row of the same matrix column. However, at matrix entry 360 of row 200Q and column 205I, data leaves the shift register 345 of that matrix entry and is outputted to its corresponding line card, in this case line card 100J. Thus, the matrix entries of a column are coupled in series.

The provision of the same set of control lines on a row-by-row basis to every matrix entry on that row, and the provision of the same bit position data input line from each of the line cards on a column-by-column basis to every matrix entry on that column, allows the matrix to, on any given interval, selectively store in any given row of the matrix the data from one of the line cards. This feature allows the data from a given one of the line cards to be reordered and/or the data from different line cards to be intermixed. For example, a first, second, third and fourth data from the line card 100A could be selectively stored in rows D, A, C, and B respectively. As another example, a first and second data from the line card 100A and a first and second data from the line card 100B could be selectively stored in rows D, A, C, and B respectively.

The interconnection of the matrix entries of a column and the control on a row-by-row basis allows the data in any given row of the matrix to be shifted to the next row of the matrix (or if at the last row, out to the line card). Since the output of each matrix is for a different line card, the matrixes are controlled independently to provide the required output to the different line cards.

Thus, the cross-connect 120 of FIG. 1 uses as its storage the store registers of each matrix entry of each matrix. Whereas the prior art had separate TSI and switch units with their own storage to reorder, intermix, and store, the storage of the cross-connect 120 is shared for these various operations. Thus, the cross-connect 120 requires less storage than the prior art cross-connect. In addition, since the cross-connect 120 can be implemented with register type storage and since register type storage can operate at higher frequencies, the cross-connect can be implemented at a greater density.

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; electrical, optical, acoustical or other forms of propagated signals (e.g., carrier wave, infrared signals, digital signals, etc.); etc. Of course, one or more parts of the invention may be implemented using any combination of software, firmware, and/or hardware.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A cross-connect comprising:
   a plurality of sets of data input lines, each of said sets of data input lines to be coupled to a different line card and the data input lines of each of said sets of data input lines have an order according to a bit position; and
   a plurality of matrixes each coupled to every of said set of data input lines and each having a set of data output lines, the set of data output lines of each of said plurality of matrices to be coupled to a different one of said line cards, wherein for each of said plurality of matrices,
   a plurality of sets of control lines, each matrix entry in a row of the matrix coupled to the same one of said sets of control lines and each matrix entry in a column of the matrix coupled to the same bit position data input line of each of said different line cards to selectively store in any given row of the matrix the data on one of said sets of data input lines; and
   the matrix entries of a column are coupled in series to selectively move the data on a row-by-row basis.

2. The cross-connect of claim 1, wherein for each of said plurality of matrices, each matrix entry of a column of said matrix comprises:
   a store mux having data inputs coupled to the data input lines coupled to said matrix entry;
   a storage element coupled to an output of said store mux to selectively store data on said output of said store mux; and
   a shift element coupled to an output of said storage element and an output of the shift element of the preceding matrix entry in the column to selectively move data from shift element to shift element and/or from storage element to shift element in the column.

3. The cross-connect of claim 1, wherein:
   for each of said plurality of matrices, said last matrix entry of each of the columns of the matrix collectively provide said set of data outputs of said matrix.

4. A network element comprising:
   a plurality of line cards; and
   a cross-connect including a plurality of sets of data input lines, each of said sets of data input lines coupled to a different one of said plurality line cards and the data input lines of each of said sets of data input lines have an order according to a bit position; and
   a plurality of matrixes each coupled to every of said set of data input lines and each having a set of data output lines, the set of data output lines of each of said plurality of matrices to be coupled to a different one of said plurality of line cards, wherein for each of said plurality of matrices,
   a plurality of sets of control lines, each matrix entry in a row of the matrix coupled to the same one of said sets of control lines and each matrix entry in a column of the matrix coupled to the same bit position data input line of each of said different line cards to selectively store in any given row of the matrix the data on one of said sets of data input lines; and
   the matrix entries of a column are coupled in series to selectively move the data on a row-by-row basis.

5. The network element of claim 4, wherein for each of said plurality of matrices, each matrix entry of a column of said matrix comprises:
   a store mux having data inputs coupled to the data input lines coupled to said matrix entry;
   a storage element coupled to an output of said store mux to selectively store data on said output of said store mux; and
   a shift element coupled to an output of said storage element and an output of the shift element of the preceding matrix entry in the column to selectively move data from shift element to shift element and/or from storage element to shift element in the column.

6. The network element of claim 4, wherein:
   for each of said plurality of matrices, said last matrix entry of each of the columns of the matrix collectively provide said set of data outputs of said matrix.

7. A cross-connect comprising:
   a plurality of sets of data input lines, each of said sets of data input lines to be coupled to a different line card, the data input lines of each of said sets of data input lines having an order according to a bit position; and
   a plurality of matrixes, for each of said plurality of matrices,
   a plurality of sets of control lines, each matrix entry in a row of the matrix coupled to the same one of said sets of control lines, wherein each row is coupled to a different one of said sets of control lines, each matrix entry including,
   a space mux, each space mux in a column of the matrix coupled to the same bit position data input line of each of said different line cards,
   a storage element coupled to the output of said space mux, and
   a shift element coupled to the output of said storage element and the output of the shift element of the preceding matrix entry in the same column.

8. The cross-connect of claim 7, wherein said storage element of a first of said matrix entries comprises:
   a store register having an input and an output, said output of said store register coupled to said shift element of said first matrix entry; and
   a timing mux having a data input coupled to the output of said space mux, a data input coupled to the output of said store register, a control input coupled to said set of control lines, and an output coupled to the input of said store register.

9. The cross-connect of claim 8, wherein said shift element of said first of said matrix entries comprises:
   a shift register having an input and an output, said output of said shift register providing said output of said shift element; and
   a shift mux having a data input coupled to the output of the store register of said first matrix entry, a data input coupled to the output of the shift element of the preceding matrix entry in the same column, a control input coupled to said set of control lines, and an output coupled to the input of said shift register.

10. The cross-connect of claim 7, wherein said shift element of a first of said matrix entries comprises:

a shift register having an input and an output, said output of said shift register providing said output of said shift element; and a shift mux having a data input coupled to the output of the storage element of said first matrix entry, a data input coupled to the output of the shift element of the preceding matrix entry in the same column, and a control input coupled to said set of control lines, and an output coupled to the input of said shift register.

11. The cross-connect of claim 7, wherein:

for each of said plurality of matrices, said last matrix entry of each of the columns of the matrix collectively provide an output of said matrix; and the output of each of said plurality of matrixes is coupled to a different one of said line cards.

12. The cross-connect of claim 7, wherein:

for each of said plurality of matrices, the set of control lines for each row of the matrix control said store muxes and storage elements to selectively store in any given row on a row-by-row basis data from any one of said different line card.

13. The cross-connect of claim 7, wherein:

for each of said plurality of matrices, the set of control lines for each row of the matrix control said shift elements to move data on a row-by-row basis in said matrix.

14. A cross-connect comprising:

a plurality of sets of data input lines, each of said sets of data input lines to be coupled to a different line card;

a plurality of matrix means, each matrix means coupled to all of said sets of data input lines to selectively store, reorder, and intermix data from said different line cards, each matrix means having a output coupled to a different one of said lines cards.

15. A method comprising:

providing on given intervals to each of a plurality of matrices a plurality of ordered bits from every one of a plurality of different line cards;

for each of said plurality of matrices,
selectively storing on given intervals in any given row of the matrix the plurality of ordered bits from one of said plurality of different line cards, wherein said rows are coupled in series, and selectively moving on given intervals data in one row of the matrix to a next row in the series; and providing on given intervals to each of said plurality of different line cards the plurality of ordered bits from the last row of a different one said plurality of matrices.

16. The method of claim 15, wherein:

the bits in the same bit positions according to said order from each of said plurality of different line cards are groups into bit position groups; and said selectively storing includes:
providing a different one of said bit position groups to each column of the matrix, wherein the same bit position group is provided to every matrix entry in that column.

17. The method of claim 15, wherein said selectively storing and said selectively moving further comprises:

providing a different set of control signals to each row of the matrix, wherein the set of control signals is provided to every matrix entry in that row.

* * * * *